(No Model.)

L. D. HEUSNER.
RAILROAD TICKET.

No. 409,203.      Patented Aug. 20, 1889.

To CHICAGO and RETURN

FORM
I-I      M. C. R. R.
EXC.

*AGENT'S STUB.—To be detached when Ticket is sold.*

Through Rate, $ _____

— A

— a

ISSUED BY
M_____C_____
——RAILROAD——

CONTRACT COUPON

I hereby purchase ticket issued by above named Company bearing same form and as this check, and agree to use said ticket subject to conditions printed thereon. That unless all the conditions on said Ticket are fully complied with, it shall be void, and the conductor or Agent of either of the Companies over which it runs may, upon its presentation, take it up, and collect full fare.

I hereby subscribe my name as the original purchaser of the above described ticket.

— B

— b c — _____ Purchaser.

Witness, _____ Agent.

— D

This Ticket Expires _____ 18 __

Immediately after sale, Agent will forward this Stub to Depot Ticket Agent of M.C.R.R. at Chicago.

— a

ISSUED BY
M_____C_____
~~RAILROAD~~

EXCURSION TICKET.

Good for One FIRST CLASS Passage.
TO
CHICAGO Ill.
AND RETURN.

When officially stamped on back hereof, and presented with coupons attached.

Subject to following Conditions.

not
It will be valid for return passage unless stamped on back by the the Depot ticket Agent of M.C.R.R. at Chicago, and the same will not be stamped making it good for the return journey, unless the holder identifies himself as being the original purchaser by signing his name in the presence of said Ticket Agent as required by him, and will then be good for return journey, for Continuous Passage only.

On Train No. _____ 18 __
from Chicago.

This Ticket Expires _____ 18 __

A. C. S.
Gen'l Pass. Ag't.

Date of sale _____ 18

— C

Witnesses
Wm R Rheem
W. R. Cushman

Inventor.
Louis D Heusner
By Jno. G. Elliott
Att'y.

UNITED STATES PATENT OFFICE.

LOUIS D. HEUSNER, OF CHICAGO, ILLINOIS.

RAILROAD-TICKET.

SPECIFICATION forming part of Letters Patent No. 409,203, dated August 20, 1889.

Application filed November 27, 1888. Serial No. 292,009. (No model.)

*To all whom it may concern:*

Be it known that I, LOUIS D. HEUSNER, a citizen of the United States, and a resident of Chicago, in the county of Cook and State of Illinois, have invented certain new and useful Improvements in Railroad-Tickets, of which the following is a specification.

This invention relates to improvements in railroad-tickets, but more especially to that class of tickets sold for "round trips," and which heretofore have been of such form that the portion of the ticket delivered to the purchaser required the signature of the purchaser at the time of purchasing the ticket, and also, by a contract on the face thereof, require his signature as identification, to be attached at the point of destination before the agent at that point will stamp the ticket to make it valid for return passage. By the use of such tickets, however, the railroad and other transportation companies are continually defrauded of large amounts which would otherwise be paid for fares by the purchaser selling the ticket at the point of destination to a "scalper," who in turn sells it for return passage to some one else, who, however, has no difficulty in making the identifying signature, because the signature of the original purchaser is on the face of the ticket and may therefore be easily counterfeited by any one with a few minutes' practice.

The prime object of this invention is to avoid the possibility of the use of a round-trip ticket for return passage by any person other than the original purchaser by having the ticket of such form that ticket-brokers and others will refuse to purchase the same because of the absence of the proper means of identification.

Another object is to have a ticket of such form that the signature of the purchaser remains at all times in the possession of the railroad company, while the portion of the ticket held by the purchaser bears no signature or other indication of the rightful owner of the ticket, and therefore must be presented at the point of destination by the original purchaser in order that his signature may correspond with the advices to the agent at that point.

These objects are attained by such a ticket as is represented in the accompanying drawing, in which, however, only such portions of the printed matter, conditions, &c., as relate to the subject-matter of the invention are shown.

Similar letters of reference indicate the same parts in the several figures of the drawing.

This ticket comprises three main parts A, B, and C, with a supplemental part D attached to and accompanying part B, if desired. These three main portions of the ticket, although forming one general ticket when the latter is printed for sale to the company using the same, are divided by lines of perforation *a* therebetween, in order that they may be readily detached from each other, while between the supplemental portion D and the part B the ticket is partially perforated on the line *b* for convenience in folding and for the removal of such supplemental portion, as will hereinafter be fully described.

The part A is designed for the agent's stub, to be detached and retained by him when the ticket is sold, as his memorandum of the sale, and the part B, including the supplemental portion D, is also to be detached by the selling-agent, while the remaining part C only of the ticket is delivered to the purchaser.

At the time of the purchase of the ticket the purchaser will be required to sign his name on the line *c* on the supplemental portion D of the part B, witnessed by the selling-agent, as indicated thereon, and then this part of the ticket—that is, the entire part B, including the supplemental portion—will be forwarded by the selling-agent to the depot ticket-agent at the point of destination.

As these tickets are excursion-tickets, sold for the round trip at a greatly-reduced rate, (frequently the price of a single fare for the round trip,) the purchaser of the ticket agrees, by certain contracts printed on the ticket, which he accepts by signing the ticket, to present the ticket to the depot ticket-agent at the point of destination, and there identify himself by a duplicate signature, and have the ticket stamped by the agent at that point before it shall be valid for return passage.

Therefore, when the holder of the main portion C of the ticket presents himself to the ticket-agent to be identified and have the ticket stamped, the latter has in his possession the portion B of the ticket, with the original purchaser's name signed thereon at *c* on the supplemental portion D, which latter is either folded under or torn off when the part B is signed upon the line D thereon, and then, if the signatures on the lines *c* and *d* correspond the agent will stamp the ticket for return passage, but otherwise he is authorized to take up and cancel the ticket. Thus it will be seen that the portion of the ticket delivered to the original purchaser does not bear either his name or any other means of identification, and should he undertake to dispose of it to any one else, especially to the ticket-brokers, they would refuse to purchase the ticket because of the absence of any signature and the further uncertainty as to the correct name which the party holding the ticket might give, for without this signature, with which to counterfeit the original, the ticket would become void, as it would also be void if presented with the wrong name of the purchaser.

I have shown in the drawing suggested forms of contracts to be printed into the ticket, merely to illustrate the use and purpose of the ticket; but of course such forms may be changed at the will of the user, and the ticket may have printed thereon, in addition thereto, such other contracts and conditions as are usual with this class of tickets, the essential feature of this ticket being its division into such parts that the signature of the purchaser may be retained by the company and forwarded to their agents at the point of destination, while the portion of the ticket delivered to the purchaser bears no signature or other means of identification which will enable him to dispose of the ticket for return passage.

Obviously the selling-agent's stub might be dispensed with, and to the passenger's ticket might be added any desired number of coupons for stop-over or other purposes without departing from the spirit of my invention so long as the destination-agent's identifying-section—that is, the part B—is retained in the ticket.

Another important advantage of these tickets over the old form is that while with the latter the ticket-brokers could employ fraudulent stamps, and thus make the tickets good for return passage without the company being able to detect the fraud, with my form of ticket when the receipts of the company are audited the use of a fraudulent stamp may not only be detected by reason of the unfilled identifying-section in the hands of the destination-agent, but the point at which such fraudulent stamp was used will also be indicated by the destination-agent's section.

Having described my invention, what I claim, and desire to secure by Leters Patent, is—

A railroad-ticket provided with the destination-agent's identifying-section B, separable from the ticket, whereby such agent only is furnished with the signature of the original purchaser for the purpose of identification, substantially as and for the purpose described.

LOUIS D. HEUSNER.

Witnesses:
W. R. OMOHUNDRO,
A. M. BENNETT.